(12) United States Patent
Keskikangas et al.

(10) Patent No.: US 11,704,435 B2
(45) Date of Patent: Jul. 18, 2023

(54) METHOD AND DEVICE FOR PARTIALLY UNMASKING AN OBJECT IN A VIDEO STREAM

(71) Applicant: Axis AB, Lund (SE)

(72) Inventors: Axel Keskikangas, Lund (SE); David Hjerpe, Lund (SE)

(73) Assignee: AXIS AB, Lund (SE)

(*) Notice: Subject to any disclaimer, the term of this patent is extended or adjusted under 35 U.S.C. 154(b) by 64 days.

(21) Appl. No.: 17/313,137

(22) Filed: May 6, 2021

(65) Prior Publication Data
US 2021/0383018 A1   Dec. 9, 2021

(30) Foreign Application Priority Data
Jun. 9, 2020 (EP) ..................... 20179088

(51) Int. Cl.
*G06F 21/62* (2013.01)
*G08B 13/196* (2006.01)

(52) U.S. Cl.
CPC ...... *G06F 21/6245* (2013.01); *G06F 21/6209* (2013.01); *G08B 13/19671* (2013.01); *G08B 13/19686* (2013.01); *G06F 2221/2113* (2013.01); *G06F 2221/2141* (2013.01)

(58) Field of Classification Search
None
See application file for complete search history.

(56) References Cited

U.S. PATENT DOCUMENTS

2003/0231769 A1* 12/2003 Bolle ................ H04L 9/0847
380/210
2009/0010570 A1* 1/2009 Yamada ............... H04N 19/17
382/312
2009/0207269 A1* 8/2009 Yoda .................. H04N 23/611
348/E5.022

(Continued)

FOREIGN PATENT DOCUMENTS

EP         3557864 A1      10/2019
KR     102066688 B1 *      1/2020

(Continued)

OTHER PUBLICATIONS

Extended European Search Report dated Sep. 16, 2020 for European Patent Application No. 20179088.8.

*Primary Examiner* — Alexander Lagor
*Assistant Examiner* — Felicia Farrow
(74) *Attorney, Agent, or Firm* — Volpe Koenig (57) ABSTRACT

A method for partially unmasking an object in a video stream comprises: displaying a first video stream in which objects are covered by privacy masks; receiving user input regarding a selection of an object being covered by a privacy mask, wherein the object has a first portion being associated with a first privacy level and a second portion being associated with a second, higher, privacy level; checking that a permission associated with the user input grants access to video data depicting object portions being associated with the first privacy level; giving access to video data depicting the first portion of the object; and displaying a second video stream which differs from the first video stream in that it includes the video data depicting the first portion of the object, while the second portion of the object is still covered by a privacy mask.

15 Claims, 6 Drawing Sheets

(56) References Cited

U.S. PATENT DOCUMENTS

2011/0145574 A1    6/2011  Ju et al.
2018/0181766 A1*  6/2018  Engel .................. G06F 3/04883
2019/0042851 A1*  2/2019  Varadarajan ........... G06V 40/20

FOREIGN PATENT DOCUMENTS

| WO | 2017/021953 A1 | | 2/2017 |
|----|----|----|----|
| WO | WO-2019068353 A1 | * | 4/2019 |
| WO | 2019/245680 A1 | | 12/2019 |

* cited by examiner

METHOD AND DEVICE FOR PARTIALLY UNMASKING AN OBJECT IN A VIDEO STREAM

TECHNICAL FIELD

The present invention relates to the field of privacy masking of video. In particular, it relates to a method and a device for partially unmasking an object in a video stream.

BACKGROUND

As video surveillance of public spaces becomes more and more common, the focus on protecting people's integrity increases. One way of protecting the integrity of objects in a video is to conceal the objects with privacy masks. A privacy mask is a masked area that conceals parts of the video from view, thereby protecting integrity of the concealed part of the video. The privacy mask may, for example, blur, pixelate or solidly cover the masked area.

During normal operation, the privacy masked video is typically shown to an operator. However, when an incident occurs, an authorized operator may request access to a non-masked version to see the objects without privacy masks. A drawback with this approach is that it will not only reveal private information for the objects being involved in the incident, but also private information regarding other objects which are not involved in the incident. Accordingly, private information of innocent objects is revealed without any reason. There is thus room for improvements.

SUMMARY

In view of the above, mitigating the above problems and providing a way of unmasking objects in video in a way that does not reveal more private information about the objects than necessary in a given situation would be beneficial.

According to a first aspect, a method for partially unmasking an object in a video stream, comprises:

displaying a first video stream in which one or more objects are covered by privacy masks, receiving user input regarding a selection of an object being covered by a privacy mask in the first video stream, wherein the object has a first portion being associated with a first privacy level and a second portion being associated with a second, higher, privacy level, checking that a permission associated with the user input grants access to video data depicting object portions being associated with the first privacy level, giving access to video data depicting the first portion of the object, and displaying a second video stream which differs from the first video stream in that it includes the video data depicting the first portion of the object, while the second portion of the object is still covered by a privacy mask.

With the above method, an operator is first presented with a video stream in which objects are covered by privacy masks. In response to selecting an object in the video stream, an authorized operator is instead presented with a video stream in which the selected object is partially unmasked. This has several advantages. Firstly, by only unmasking the selected object, private information regarding the other objects is not revealed. Secondly, by partially unmasking the selected object, a portion of the selected object having a lower privacy level may be revealed while a portion of the object having a higher privacy level may remain concealed so as to keep protecting the more sensitive private information regarding the selected object. In many cases, it is enough to reveal video data depicting the object portion having the lower privacy level in order to analyze an incident. Particularly, the lower privacy level video data may be enough to see the actions of a suspected object and it is therefore not necessary to reveal higher privacy level video data before a suspicion is verified. Consider the example of video surveillance of a shop, where a privacy masked object is suspected of shoplifting. To deem whether or not shoplifting occurred, it is typically enough to unmask the body, or even only the arms and hands, of the suspected object. Revealing the face of the suspected object, and thereby its identity, is not necessary until the suspected action has been verified.

In view of the above, the method thus enables selective and partial unmasking of objects. In that way, private information regarding objects in a video is not unnecessarily revealed. Further, by checking the permissions of the user, the method makes sure that only authorized users are allowed to access the partially unmasked video. In particular, the permissions of the user are linked to the privacy levels of the different portions of the object. Thus, a first user may not be permitted to access video data depicting any portion of the object. A second user may be permitted to access video data depicting object portions of the first privacy level. A third user may be permitted to further access video data depicting object portions of the second, higher, privacy level. The permissions are thus set on an object portion level rather than an object level, thereby allowing access control of video data on an object portion level.

An object may have a plurality of object portions. Particularly, it may have a first portion and a second portion. In one example, the first portion corresponds to the body (except for the face) of a person and the second portion to a face of the person. In another example, the first portion corresponds to the body (except for the license plate) of a car and the second portion to the license plate of the car. It is understood that an object may have more than two portions. The object portions are assumed to be non-overlapping.

The object portions may be associated with different privacy levels. By a privacy level of an object portion is generally meant how sensitive the object portion is from an integrity point of view. For example, the privacy level may indicate how easy it is to identify the object based on image data depicting the object portion. The privacy levels of the object portions may form a hierarchy of privacy levels reaching from a lowest privacy level to a highest privacy level.

A privacy mask is a masked area that conceals parts of a video from view. The purpose of the privacy mask is to protect the integrity of the concealed part of the video. The privacy mask may be of any kind known in the art. For example, it may be a contour mask following the contour of the object, a rectangular mask, a pixelated mask, a Sobel mask, a solid mask, etc.

By a privacy mask covering an object or an object portion is meant that the privacy mask conceals an image area associated with the object or the object portion. In particular, at the outset of the method, the privacy masks at least cover the first and the second object portions of the one or more objects. In other words, they cover object portions being associated with the first privacy level and any higher level of privacy. It may therefore be said that the privacy masks cover the objects to an extent necessary for a current privacy level to be fulfilled. The privacy mask is dynamic. Particularly, as the object moves, the image area corresponding to the object moves and thereby also the privacy mask.

By a selection of an object is meant that at least one object is selected. It may hence be the case that more than one object is indicated by the user input.

By video data depicting an object portion is meant video data that depicts the object portion when not being covered by a privacy mask.

It is further noted that the second video stream typically only differs from the first video stream in that it includes the video data depicting the first portion of the object.

By a permission associated with a user input is generally meant a permission or authorization of a currently logged-in user making the user input. By the permission granting access to video data depicting object portions being associated with a certain privacy level is generally meant that the currently logged-in user has the permission to get access to the video data depicting object portions having that certain privacy level.

The video data depicting the first portion of the object may be encrypted, wherein access to the video data depicting the first portion of the object is given by decrypting the video data depicting the first portion of the object using a first decryption key associated with the permission that grants access to video data depicting object portions being associated with the first privacy level. The access to the video data depicting the first portion of the object may hence be controlled by means of decryption. Specifically, only a user that has a permission to access the right decryption key will be able to see the partially unmasked video.

The method may further comprise generating the second video stream by merging the first video stream with the video data depicting the first portion of the object. In that way, a video stream may be generated in which all non-selected objects are covered by privacy masks, as in the first video stream, while the first portion of the selected object is visible.

The video data depicting the first portion of the object may be accessed from a video stream in which object portions associated with a first privacy level are visible and object portions associated with the second privacy level are covered by privacy masks. A video stream in which all the objects are partially unmasked may hence be used as input. By combining that partially unmasked video stream, with the fully masked first video stream it is possible to generate the second video stream in which only the selected object is partially unmasked. For example, the second video stream may be generated by replacing an image region which includes the object being covered by a privacy mask in the first video stream by a corresponding image region in the video stream in which object portions associated with a first privacy level are visible and object portions associated with the second privacy level are covered by privacy masks.

The user input may select an object in various ways. According to an embodiment, the user input regarding a selection of an object may be indicative of an image region in the first video stream, the image region including the object being covered by a privacy mask in the first video stream. For example, the user input may draw an outline of a selected image region, such as by drawing the outline of a rectangle around the selected object. This provides an easy way of selecting an object. Further, it puts low requirements on the system since the system does not need to be aware of which image regions that corresponds to privacy masked objects. That input is instead given by the user in this case.

In an alternative embodiment, the first video stream includes metadata being indicative of image regions in the first video stream being covered by privacy masks, wherein the user input regarding a selection of an object is indicative of an image position within one of the image regions. For example, the user input may be in the form of a mouse click on an object. In this case the metadata thus indicates which image regions in the first video stream that corresponds to privacy masked objects. This is advantageous in that the metadata allows the method to derive what image region in the first video stream corresponds to the selected object as long as the user input specifies an image position within one of the privacy masked objects.

As described above, the method allows an authorized user to selectively and partially unmask an object in a video. In some cases, the selectively and partially unmasked video may show that the selected object is innocent. In such cases there is no need to further unmask the selected object. However, in other cases, the selectively and partially unmasked video may show that the selected object is guilty of an incident. In those cases, it could be desirable to further unmask the selected object. For that purpose, the method may further comprise: checking that the permission associated with the user input further grants access to video data depicting object portions being associated with the second privacy level, giving access to video data depicting the second portion of the object, and displaying a third video stream which differs from the first video stream in that it includes both the video data depicting the first portion of the object and the video data depicting the second portion of the object. Accordingly, a user being permitted to also view object portions of the second, higher privacy level, is allowed to further unmask the selected object to reveal object portion of the higher privacy level. The step of displaying the third video stream may be made in response to a further user input. Thus, the further unmasking is not performed until the user actively indicates that he wants to do so.

This may be extended to situations where there are more than two privacy levels ordered in a hierarchy. First, the user is presented with a fully masked video, corresponding to a lowest privacy level in the hierarchy. Responsive to selection of an object, a permitted user is presented with video in which the selected object is partially unmasked to reveal object portions of the following, higher, privacy level in the hierarchy. An even further permitted user may then be presented with a video in which the selected object is further unmasked to also reveal object portions of the following, even higher, privacy level in the hierarchy, etc. Accordingly, the selected object may be unmasked, privacy level by privacy level, as long as the permission of the user permits.

Also, in this case the access to video data depicting the second object portion may be controlled by way of decryption. Specifically, the video data depicting the second portion of the object may be encrypted, and access to the video data depicting the second portion of the object may be given by decrypting the video data depicting the second portion of the object using a second decryption key associated with the permission that further grants access to video data depicting object portions being associated with the second privacy level.

The third video stream may be generated by merging the first video stream with the video data depicting the first portion of the object and the video data depicting the second portion of the object. In that way, a video stream may be generated in which all non-selected objects are covered by privacy masks, as in the first video stream, while the first portion and the second portion of the selected object are visible.

The video data depicting the second portion of the object may be accessed from a video stream in which object portions associated with at least the second privacy level are visible. For example, the video stream may include video data depicting both the first object portions and the second object portions of the objects, such as in a fully unmasked stream. In another example, the video data depicting the second portion of the object is accessed from a video stream in which only object portions associated with the second privacy level are visible. In the latter case, the third video stream may be a combination of three different streams; a fully masked video stream, a video stream which includes video data depicting the first object portions, and a video stream which only includes video data depicting the second object portions.

According to a second aspect, a device for partially unmasking an object in a video stream comprises circuitry configured to execute:

a display function configured to display a first video stream in which one or more objects are covered by privacy masks, a user input receiving function configured to receive a user input regarding a selection of an object being covered by a privacy mask in the first video stream, wherein the object has a first portion being associated with a first privacy level and a second portion being associated with a second, higher, privacy level, a permission checking function configured to check that a permission associated with the user input grants access to video data depicting object portions being associated with the first privacy level, a video data accessing function configured to give access to video data depicting the first portion of the object, and a display function configured to display a second video stream which differs from the first video stream in that it includes the video data depicting the first portion of the object, while the second portion of the object is still covered by a privacy mask.

According to a third aspect, a non-transitory computer-readable storage medium comprises computer-code instructions adapted to carry out the method of the first aspect when executed by a device having processing capability.

The second and third aspects may generally have the same features and advantages as the first aspect. It is further noted that all possible combinations of features are possible unless explicitly stated otherwise.

BRIEF DESCRIPTION OF THE DRAWINGS

The above, as well as additional objects, features and advantages, will be better understood through the following illustrative and non-limiting detailed description of embodiments, with reference to the appended drawings, where the same reference numerals will be used for similar elements, wherein.

DETAILED DESCRIPTION

The present teachings will now be described more fully hereinafter with reference to the accompanying drawings, in which different embodiments are shown.

Figure 1:
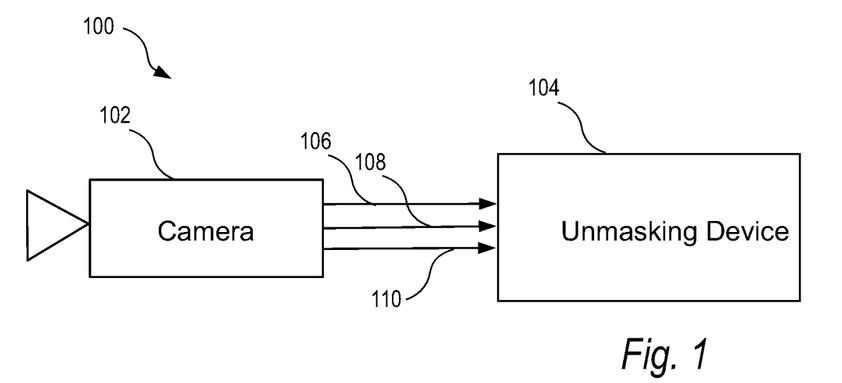
FIG. 1 schematically illustrates a system for partially unmasking an object in a video stream according to a first group of embodiments.

FIG. 1 illustrates a system 100 in which example embodiments may be implemented. The system 100 comprises a camera 102 and a device 104 for partially unmasking an object in a video stream. The device 104 may form part of a video management system via which a user can manage video captured by the camera 102. For example, a user may view video and provide user input relating to the video via the device 104. In particular, a user may, via device 104, manage privacy masks being included in the video.

Figure 5A:
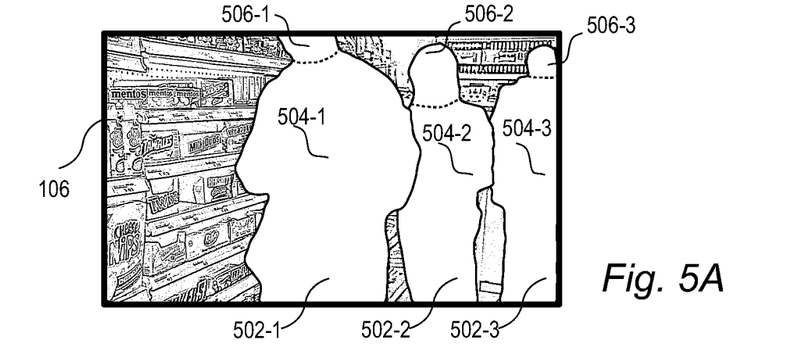
FIGS. 5A-5D illustrate example video frames of video streams which are input to the device of FIG. 2.
Figure 5B:
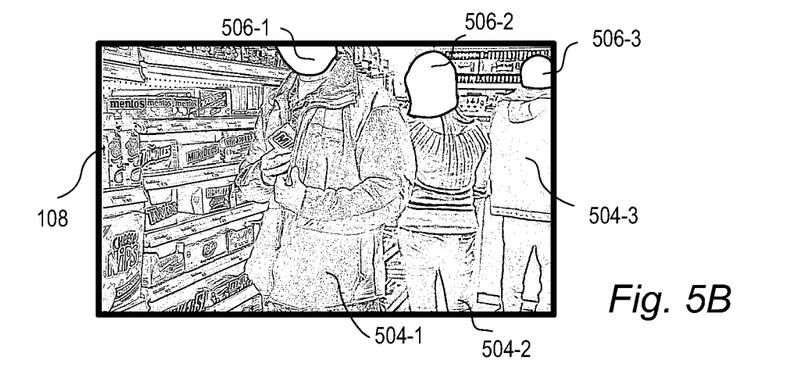
Figure 5C:
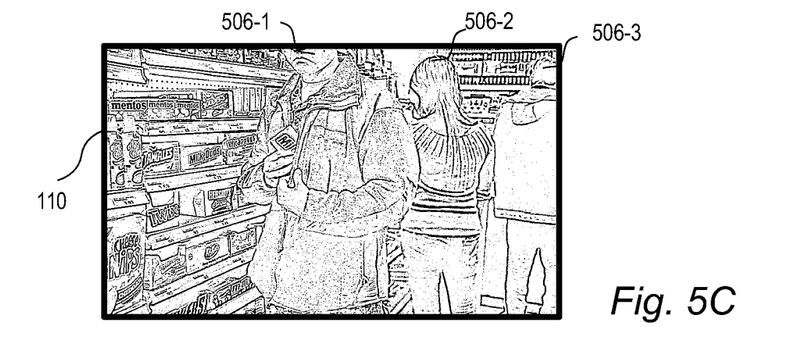
Figure 5D:
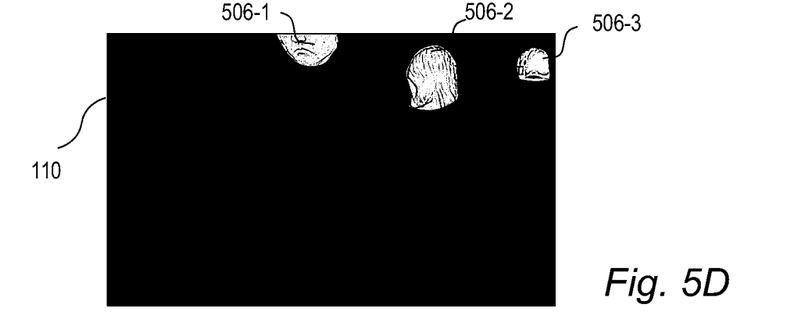

The camera 102 of system 100 is configured to output at least three video streams 106, 108, 110. The output video streams 106, 108, 110 differ from each other to the extent that objects depicted in the video are covered by privacy masks. Particularly, the objects may be covered by privacy masks to a larger extent in video stream 106 than in video stream 108. Further, objects may, in turn, be covered by privacy masks to a larger extent in video stream 108 than in video stream 110. For example, as shown in FIG. 5A, one or more objects 502-1, 502-2, 502-3 may be fully covered by privacy masks in the video stream 106. In the video stream 108, the one or more objects 502-1, 502-2, 502-3 may be partially covered by privacy masks, as shown in FIG. 5B. Further, in the video stream 110, there may be no privacy masks covering the one or more objects 502-1, 502-2, 502-3 as illustrated in FIG. 5C. As an alternative, the video stream 110 may only include video data depicting the portions 506-1, 506-2, 506-3 of the objects being covered by privacy masks in the video stream 108, as shown in FIG. 5D. In the latter case, a fully unmasked video may be generated by combining video streams 108 and 110.

The video streams 106, 108, 110 may further each include metadata. The metadata may, for each video frame in the stream, indicate the image regions being covered by privacy masks in the respective video stream 106, 108, 110. Thus, the metadata of the video stream 106 may indicate three image regions corresponding to the objects 502-1, 502-2, 502-3. Similarly, metadata of the video stream 108 may indicate three image regions corresponding to the object portions 506-1, 506-2, 506-3 that are covered by privacy masks. The metadata may further include object tracking metadata. The object tracking metadata associates each image region being covered by a privacy mask with an object identifier. The object tracking metadata enables keeping track of the movements of the privacy masked image regions over time.

Video data may be associated with different levels of privacy. Video data being associated with a higher level of privacy indicates that the video data is more sensitive, from an integrity point of view, than video data having a lower level of privacy. In particular, different portions of an object may be associated with different levels of privacy. For example, the plurality of objects 502-1, 502-2, 502-3 shown in FIG. 5A may have different portions being associated with different privacy levels. For example, an object may have a first portion 504-1, 504-2, 504-3 corresponding to a first level of privacy, and a second portion 506-1, 506-2, 506-3 corresponding to a second, higher level of privacy. In the illustrated example of FIG. 5A, the object 502-1, 502-2, 502-3 is a person, the first portion of the objects 504-1, 504-2, 504-3 corresponds to the body of the person, and the second portion 506-1, 506-2, 506-3 of the objects corresponds to the head of the person. The head of a person are hence in this example associated with a higher privacy level than the rest of the body of the person. It is understood that an object may have more than two portions having different privacy levels. By way of example, the hands of the person may be considered a third portion of the person being associated with a privacy level which is different from that of the body and the head of the person. It is further understood that the objects are not limited to persons. In another example, an object could be a car, and the license plate of the car may be given a higher privacy level than the rest of the car. Further, the windows of the cars may be considered a third portion of the car being associated with a privacy level which is different from that of the license plate and any other portion of the car.

The video streams 106, 108, 110 hence include video data depicting object portions being associated with different levels of privacy. Particularly, the video stream 106 only includes video data depicting the background and not depicting any portion of the one or more objects 502-1, 502-2, 502-3. The privacy level of the video stream 106 therefore correspond to the privacy level of the background, i.e., a privacy level which is lower than both the first and the second privacy level. The video stream 108 includes video data depicting object portions 504-1, 504-2, 504-3 being associated with the first privacy level. The privacy level of the video stream 108 therefore corresponds to the first privacy level. The video stream 110 includes video data depicting object portions 506-1, 506-2, 506-3 being associated with the second, higher, privacy level. The privacy level of the video stream 110 therefore correspond to the second privacy level. The privacy levels of the streams 106, 108, 110 thus form a hierarchy of privacy levels, ranging from a lower to a highest privacy level.

The video streams 106, 108, 110 may be encrypted with different encryption keys depending on the privacy level of the object portions being depicted therein. For example, the video stream 108 may be encrypted using an encryption key associated with the first privacy level, and the video stream 110 may be encrypted using an encryption key associated with the second, higher, privacy level. The video stream 106 may be encrypted with an encryption key associated with a privacy level of the background. Alternatively, the video stream 106 may not be encrypted at all.

The purpose of the encryption is to control access to the video data in the video streams 106, 108, 110. In particular, in order to access video data in a video stream 106, 108, 110, the video stream must first be decrypted. Thus, only a user having access to the correct decryption key can decrypt a video stream and access the video data therein. A user's access to decryption keys, and thereby the access to video data of different privacy levels, can be controlled via permissions. For example, a user may have a permission to access video data depicting object portions of the first privacy level, but not the second, higher, privacy level. Such a permission may grant access to a decryption key that can be used to decrypt the partially masked video stream 108, but not to a decryption key that can be used to decrypt the non-masked video stream 110. Another user may have a permission to access video data depicting object portions of the second, higher, privacy level. Such a higher permission may grant access to a decryption key that can be used to decrypt the non-masked video stream 110 associated with the second privacy level. Accordingly, a higher user permission may be required to decrypt the non-masked video stream 110 than the partially masked video stream 108. Further, a lowest user permission may be required to decrypt the fully masked video stream 106 in case it is encrypted. It is further understood that a permission that grants access to decryption keys for decrypting a video stream associated with a certain privacy level also grants access to decryption keys for decryption video streams associated with privacy levels being lower than that certain level. By way of example, a user having a permission to access the video stream 110 depicting the heads of the persons also has the permission to access the video stream 108 depicting the bodies of the persons and the video stream 106 depicting the background of the objects.

Figure 2:
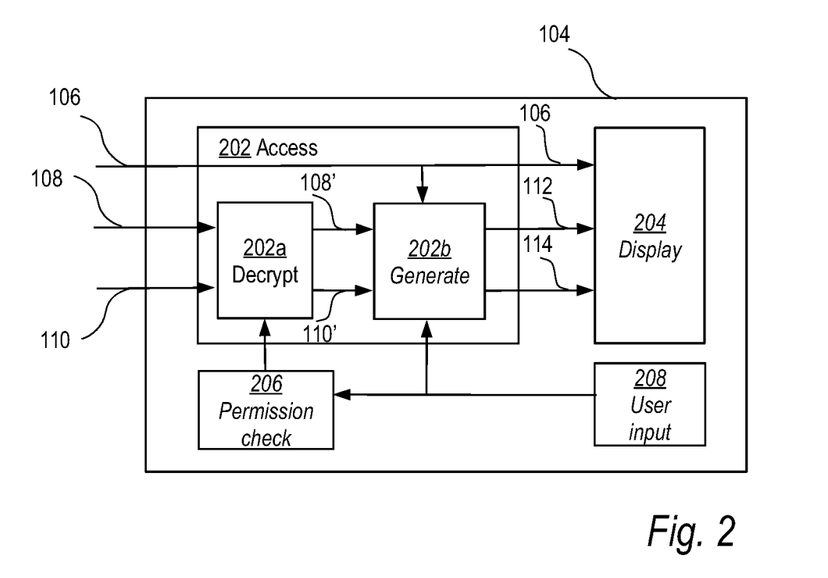
FIG. 2 schematically illustrates a device for partially unmasking an object in a video stream according to the first group of embodiments.

FIG. 2 illustrates the device 104 in more detail. The device 104 includes a video data access component 202, a display component 204, a permission checking component 206, and a user input receiving component 208. The video data access component may include a decryption component 202a and a video stream generating component 202b.

Figure 6:
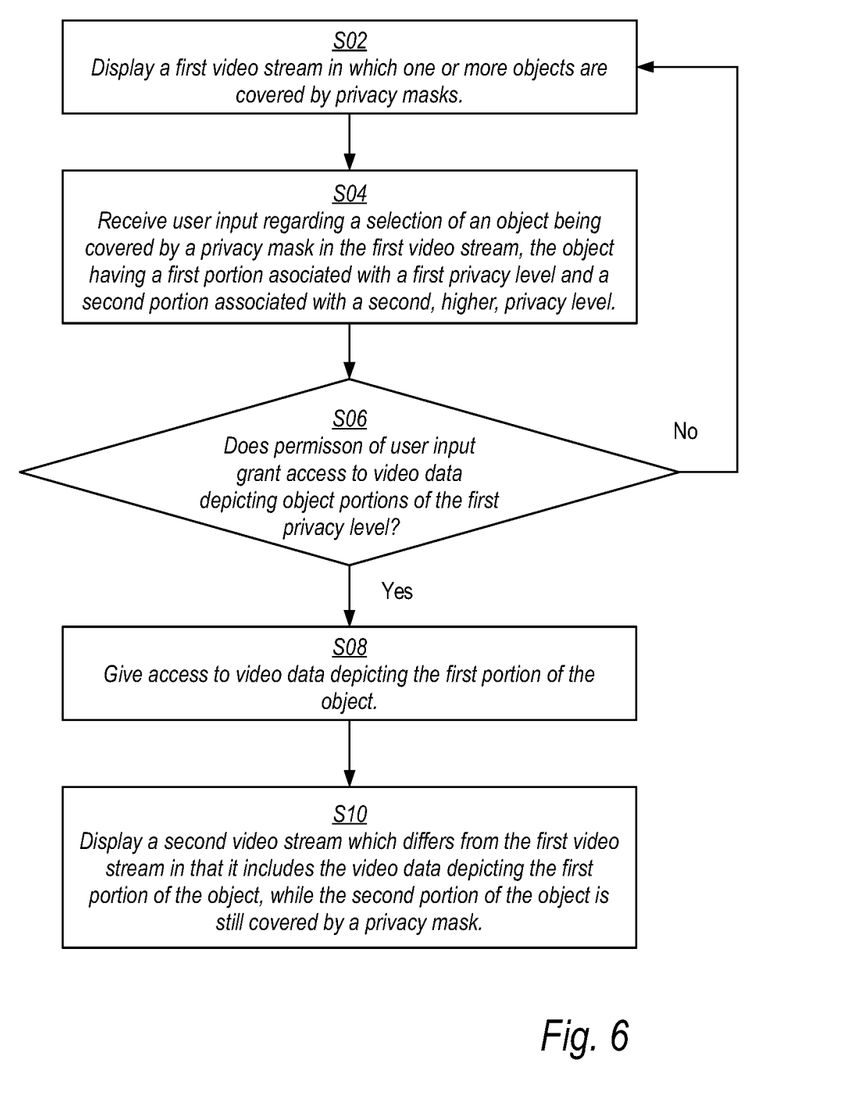
FIG. 6 is a flow chart of a method for partially unmasking an object in a video stream.

The operation of the device 104 when executing a method for partially unmasking an object in a video stream will now be explained in more detail with reference to FIGS. 1, 2, 5, 7 and the flowchart of FIG. 6.

Figure 7A:
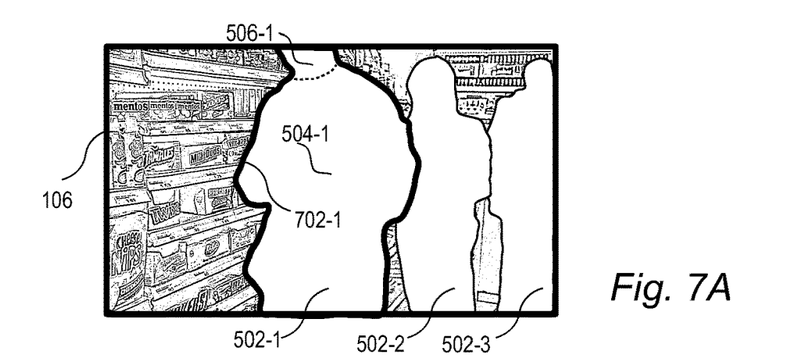
FIGS. 7A-7D illustrate example video frames of video streams which are displayed or generated by the device of FIG. 2 in example embodiments.

In step S02, the display component 204 displays the video stream 106, referred to herein as the first video stream, in which one or more objects 502-1, 502-2, 502-3 are covered by privacy masks. FIG. 7A illustrates a snapshot of the video stream 106 as displayed by the display component 204. For example, the display component 204 may cause the first video stream 106 to be shown on a display to a user currently being logged into the device 104. In case the first video stream 106 is encrypted, the decryption component 202a may first decrypt the first video stream.

In step S04 the user input component 208 receives a user input regarding a selection of an object being covered by a privacy mask in the first video stream 106. The user input is received from a user currently being logged into the device 104. By way of example, object 502-1 shown in the snapshot of FIG. 7A may be selected by the user input. The selected object has a first portion 504-1 being associated with a first privacy level and a second portion 506-1 being associated with a second, higher, privacy level. The user input may be indicative of an image region which includes the selected object 502-1 in the first video stream 106. In one example, the user input may specify the outline of such an image region, e.g., by drawing a rectangle around the selected object 502-1 in the video stream shown on the display. Accordingly, the image region is not restricted to only include the selected object 502-1, but portions of the background and of other objects may also be included within the image region. In this example, objects that fall within the indicated image region will be partially unmasked as further described below. It is noted that the selected object(s) may, over time, move out of the indicated image region. In that case, the user may via a further user input move the image region to again include the selected object(s). In that way, it is possible to adjust the image region over time to keep partially unmasking the selected object(s). Alternatively, the movement of the selected object(s) may be derived from object tracking metadata which assigns object identifiers to privacy masked image regions in the video and keeps them updated over time. Thus, if the image region indicated by the user input includes one or more objects, their object identifiers may be derived from the object tracking metadata. The movements of the objects with those identifiers may then be followed via the object tracking metadata. In that way, image regions corresponding to the selected objects may be tracked over time. This enables keeping the selected objects partially unmasked over time.

In another example, the user input may specify an image position within an object being covered by a privacy mask in the first video stream 106. For example, the user may click on an object to select that object. In the latter example, metadata included in the first video stream 106 may be used in order to derive what image region in the video stream 106 corresponds to the selected object 502-1. Further, object tracking metadata enables following the image regions corresponding to the selected object(s) over time. FIG. 7A shows an image region 702-1 which includes the selected object 502-1. It is further understood that the user input may concern a selection of more than one object being covered by a privacy mask. For example, the user may select two or all objects depicted in the first video stream 106. In that case, the image region will instead include all selected objects.

The received user input may further be logged by the device 104. For example, a received user input may be logged together with information regarding the indicated image region or an indication regarding which objects were selected. Further, the number of selected objects may be logged. In that way, a user's action may be tracked to identify possible abuse of the method. For example, it would be possible to identify if a user deviates from his instructions and indicates that he wants the whole images of the video partially unmasked for long periods of time.

Responsive to the user input, the permission checking component 206 checks in step S06 whether a permission associated with the user input grants access to video data depicting object portions associated with the first privacy level. In more detail, the permission checking component 206 may check the permissions of the logged-in user. This may include checking whether the logged-in user has access right to a decryption key that may be used to decrypt video data depicting object portions of the first privacy level. Specifically, it may be checked that the logged-in user has access right to a decryption key for decrypting the partially masked video stream 108. For example, the permission checking component 206 may check whether the logged-in user is part of a user group, such as an active directory, that has right to access video data depicting object portions associated with the first privacy level. Members of such a user group may, Members of such a user group may, in particular, have access rights to a decryption key that may be used to decrypt the video stream 108.

In case the permission checking component 206 comes to the conclusion that the permission associated with the user input does not grant access to video data of the first privacy level, it will instruct the video data access component 202 to not give access to any video data of the first privacy level. As a result, the display component 204 will keep displaying the first video stream 106 to the user.

In case the permission checking component 206 finds that the permission associated with the user input grants access to video data of the first privacy level, it instructs the video data access component 202 to give access to video data depicting the first portion 504-1 of the selected object 502-1. Generally, the video data access component 202 controls which video data is accessed and displayed by the display component 204. The video data access component 202 controls access to video data by way of decryption. In particular, if a permission associated with the user input grants access to video data depicting certain object portions, the video data access component 202 may decrypt such video data.

Figure 7B:
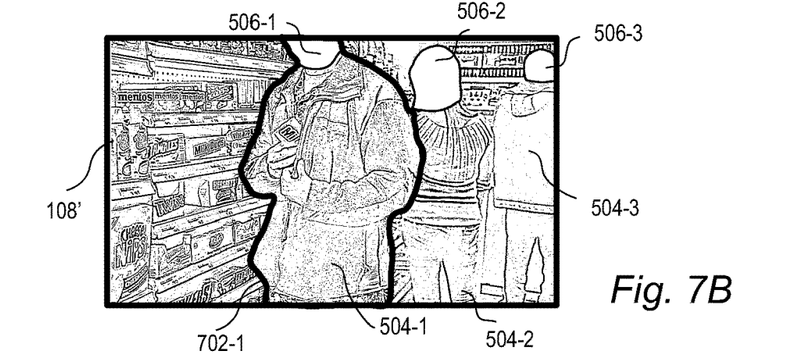
Figure 7C:
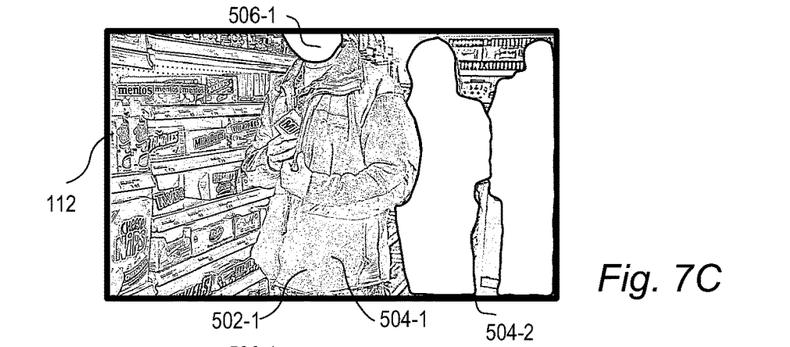

Responsive to the instruction from the permission checking component 206, the video data access component 202 proceeds in step S08 to give access video data depicting the first portion 504-1 of the selected object 502-1. In more detail, the decryption component 202a may proceed to decrypt the partially masked video stream 108 using the decryption key that the logged-in user has permission to access to produce a decrypted video stream 108'. A snap-shot of the decrypted video stream 108' is shown in FIG. 7B. As shown, object portions 504-1, 504-2, 504-3 of the first privacy level (the bodies) of the objects are visible in the decrypted video stream 108, while object portions 506-1, 506-2, 506-3 of the second privacy level (the heads) are covered by privacy masks. The decrypted video stream 108' may then be input to the video stream generating component 202b which merges it with the first video stream 106 to generate a second video stream 112. A snapshot of the second video stream 112 is shown in FIG. 7C. The second video stream 112 differs from the first video stream 106 in that it includes video data depicting the first portion 504-1 of the selected object 502-1, while the second portion 506-1 of the selected object 502-1 is still covered by a privacy mask. In other aspects the second video stream 112 is identical to the first video stream 106. Specifically, the other non-selected objects 502-2 and 502-3 are still covered by privacy masks.

In order to generate the second video stream 112, the video stream generating component 202a may combine video data from the first video stream 106 with video data from the decrypted video stream 108'. In particular, in the image region 702-1 corresponding to the selected object 502-1 it may use video data from the decrypted video stream 108', while video data from the first video stream 106 is used outside of the image region 702-1. For example, the video stream generating component 210 may extract video data from the image portion 702-1 corresponding to the selected object 502-1 from the decrypted video stream 108'. The so extracted video data may then be used to replace the corresponding image portion 702-1 in the first video stream 106. This process may be repeated for each video frame to produce the video stream 112.

In step S10, the display component 204 then displays the second video stream 112. Accordingly, responsive to a user input that selects an object in the displayed first video stream 106, a permitted user is presented with a second video stream 112 in which the selected object is partially unmasked to reveal video data depicting object portions having the first level of privacy, but not object portions having the second, higher, level of privacy.

Figure 7D:
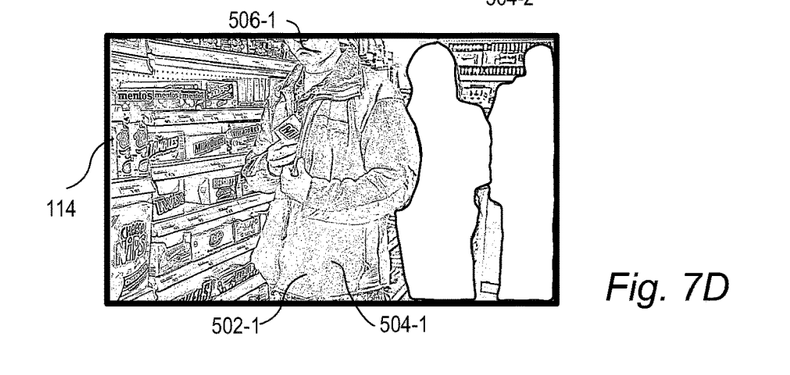

In step S06, the permission checking component 206 checked whether a permission associated with the user input granted access to video data depicting object portions of the first privacy level. If that was the case, the selected object 502-1 in the first video stream 106 was partially unmasked to reveal video data depicting its object portion 504-1 of the first privacy level. In some cases, the permission of the user input may further grant access to video data depicting object portions 506-1, 506-2, 506-3 of the second, higher, privacy level. In those cases, the user may, if permitted, further be presented with a video stream where the selected object is further unmasked to also reveal video data depicting the object portion of the second privacy level. For example, the user may provide a further user input to indicate that he desires to further unmask the selected object 502-1. In response to such a further user input, the permission checking component 206 may check whether the permission associated with either the first or the further user-input grants access to video data depicting object portions 506-1, 506-2, 506-3 of the second privacy level. The check may be performed in the same way as described in connection to step S06 above, e.g. by checking that the currently logged-in user has right to access a decryption key corresponding to the video stream 110 depicting object portions of the second privacy level. If there is such a permission, the permission checking component 206 may instruct the video data access component 202 to give access video data depicting the second portion 506-1 of the selected object 502-1. The video access component 206 may then proceed to give access to the video data. For example, the decryption component 202a may decrypt the video stream 110 using the appropriate decryption key that the user has the permission to access. The decrypted version 110' of video stream 110 may then be input to the video stream generating component 202a. By merging the decrypted video stream 110' with the first video stream 106, a third video stream 114 which includes video data depicting both the first portion 504-1 and the second portion 506-1 of the selected object 502-1 may be generated. The merging can be performed according to the same principles as described above in connection to the generation of the second video stream 112. A snapshot of the video stream 114 is shown in FIG. 7D. As can be seen therein the video stream 114 differs from the first video stream 106 in that it includes video data depicting both the first portion of the object and the video data depicting the second portion of the object. In other aspects it is identical to the first video stream 106. In cases where the video stream 110' only includes video data depicting object portions of the first privacy level 506-1, 506-2, 506-3, the decrypted video stream 110' may be merged with both the first video stream 106 and the video stream 108'. For example, video data depicting the first object portion 504-1 of the selected object 502-1 may be collected from the video stream 108', video data depicting the second object portion 506-1 of the selected object 502-1 may be collected from the video stream 110', and video data depicting the remainder of the scene may be collected from the first video stream 106. The so collected video data may then be combined to produce the video stream 114. The video stream 114 may then be displayed by the display component 204. Accordingly, responsive to a further user input, a permitted user is presented with a video stream 114 in which the selected object is unmasked to reveal video data depicting object portions of the first level of privacy as well as video data depicting object portions of the second level of privacy.

Figure 3:
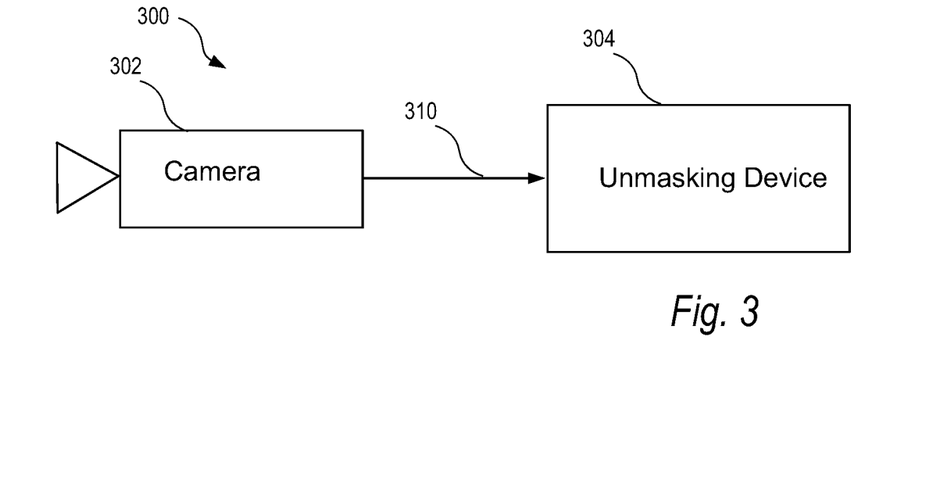
FIG. 3 schematically illustrates a system for partially unmasking an object in a video stream according to a second group of embodiments.
Figure 8A:
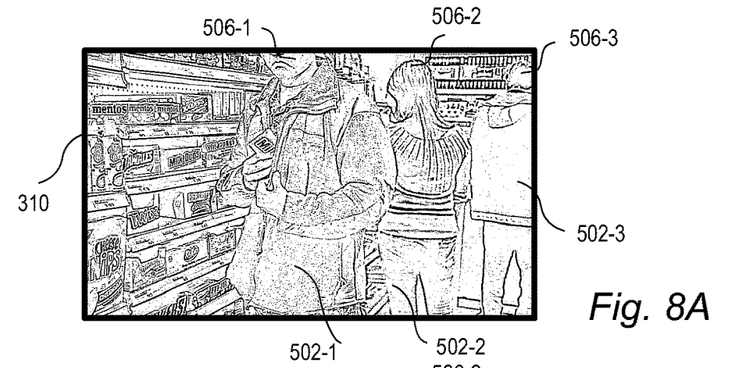
FIGS. 8A-8D illustrate example video frames of video streams which are displayed or generated by the device of FIG. 4 in example embodiments.

FIG. 3 illustrate an alternative system 300 in which example embodiments may be implemented. The system 300 comprises a camera 302 and a device 304 for partially unmasking an object in a video stream. The device 304 may form part of a video management system via which a user may manage video captured by the camera 302. The system 300 differs from the system 100 in that the camera 302 does not perform any privacy masking. The camera 302 instead outputs a video stream 310 which does not include any privacy masks. A snapshot of the video stream 310 is shown in FIG. 8A. As will be described in more detail below, any privacy masking of objects depicted in the video stream 310 takes place in the device 304.

Figure 4:
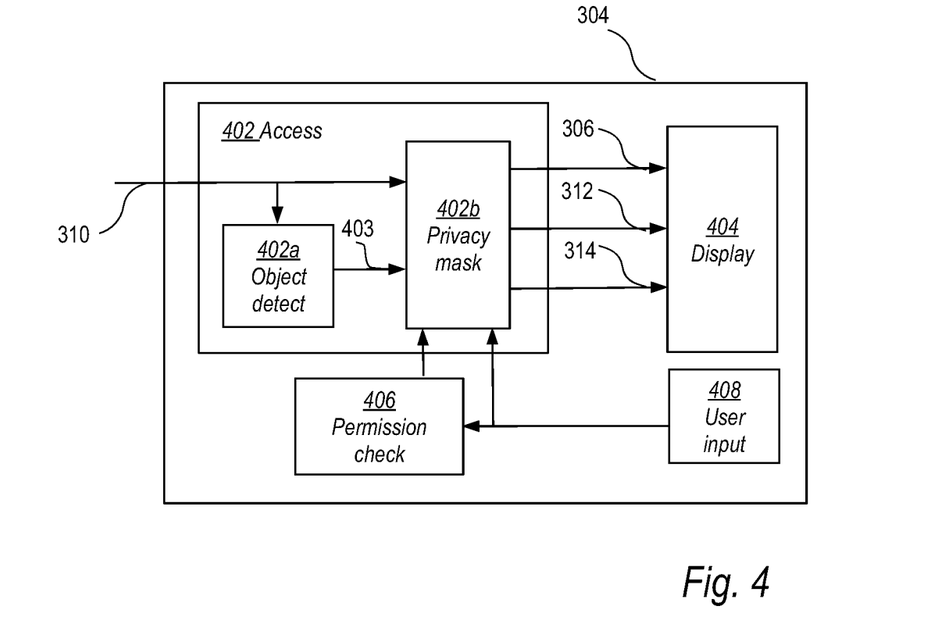
FIG. 4 schematically illustrates a device for partially unmasking an object in a video stream according to the second group of embodiments.

FIG. 4 illustrates the device 304 in more detail. The device 304 includes a video data access component 402, a display component 404, a permission checking component 406, and a user input receiving component 408. The display component 404, the permission checking component 406, and the user input receiving component 408 operate in the same way as the corresponding components of the device 104. However, the video data access component 402 differs from the corresponding component of the device 104. The video data access component 402 may include an object detection component 402a, and a privacy masking component 402b.

The operation of the device 304 when executing a method for partially unmasking an object in a video stream will now be explained in more detail with reference to FIGS. 3, 4, 8 and the flowchart of FIG. 6.

The device 304 receives a video stream 310 as input. The video stream 310 does not include any privacy masks. Thus, and as shown in FIG. 8A, video data depicting all objects 502-1, 502-2, 502-3 is included in the input video stream 310.

The video stream 310 is received by the video data access component 402. The video data access component 402 controls access to the video data included in the video stream 310. Particularly, it controls which video data is accessed by the display component 404. As will be further explained below, the access control is based on user permissions. The video data access component 402 controls access to video data by using privacy masking. In particular, it may cover objects or object portions depicted in the video stream 310 by privacy masks in order to prevent the video data depicting those object or object portions from being accessed.

Figure 8B:
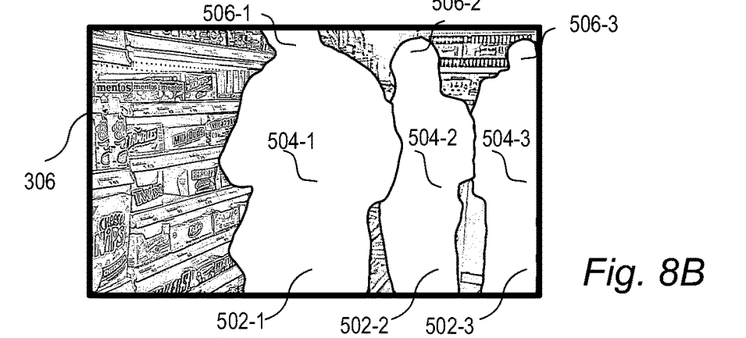

Initially, the video data access component 402 performs privacy masking to cover the one or more objects 502-1, 502-2, 502-3 depicted in the video stream 310. Thus, at this stage, the video access component 402 does not give access to video data depicting the one or more objects 502-1, 502-2, 502-3. The resulting video stream is output from the video access component 402 as a first video stream 306. A snapshot of the first video stream 306 is shown in FIG. 8B. In step S02, the first video stream 306 is displayed by the display component 404.

The privacy masking may take place in two steps; first the object detection component 402a may perform object detection to detect the objects 502-1, 502-2, 502-3 in the video stream 310, and then the privacy masking component 402b may cover the detected objects 502-1, 502-2, 502-3 with privacy masks. In order to detect objects, the object detection component 402a may use object detection algorithms that are known in the art. This includes object detection algorithms that are based on machine learning, such as deep learning-based algorithms. In the example of FIG. 8, it may use algorithms that detect persons. The object detection component 402a may further detect object portions. For instance, it may detect the object portions 506-1, 506-2, 506-3 (heads) being associated with the second privacy level. For that purpose, it may use a detection algorithm adapted to detect such object portions. For instance, it may use a head detection algorithm to detect the heads of the persons. Generally, what types of objects and object portions to detect are typically predefined and known to the object detection component 402a.

The object detection component 402a may output information 403 being indicative of the detected objects and object portions. The information 403 may indicate image regions in the video stream 310 where objects and/or object portions are detected. It may also indicate the type of object or object portion, such as whether it is a person, or a head.

The information 403 is then used by the privacy masking component 402b when adding privacy masks to the input video stream 310. For example, it may be used in order to cover image regions indicated in the information 403 by privacy masks. Specifically, to generate the first video stream 306, the privacy masking component 402b may cover image regions of objects being of the type "persons". The privacy masks may be of any type that protect the integrity of the object or object portion. For example, it may be a contour mask, a rectangular mask, a pixelated privacy mask, a Sobel mask, a solid privacy mask, etc.

The privacy masking component 402b may further keep a record of privacy levels associated with different types of objects or object portions. In the illustrated example, the record may specify that the object portion type "body" has a first privacy level, while the object portion type "head" has a second, higher, privacy level. This enables the privacy masking component 402b to selectively privacy mask object portions based on their associated privacy levels.

In step S04, a user input regarding a selection of one or more of the objects 502-1, 502-2, 502-3 being covered by a privacy mask in the first video stream 306 is received via user input receiving component 408. For example, the user input may select object 502-1. The device 304 may generally perform steps S04 and S06 in the same manner as the previously described device 104.

Responsive to that user input, the permission checking component 406 proceeds in step S06 to check whether a permission of the user input grants access to video data depicting object portions of the first privacy level. For example, the permission checking component 206 may check whether the logged-in user is part of a user group, such as an active directory, that has right to access video data depicting object portions associated with the first privacy level.

In case the user input is associated with a user permission that grants access to video data depicting object portions 504-1, 504-2, 504-3 of the first privacy level, the permission checking component 406 may instruct the video data access component 402 to give access to such video data for the selected object 502-1. Responsive to the instruction, in step S08, the video data access component 402 gives the display component 404 access to video data depicting the object portion 504-1 of the first privacy level for the selected object 502-1.

Figure 8C:
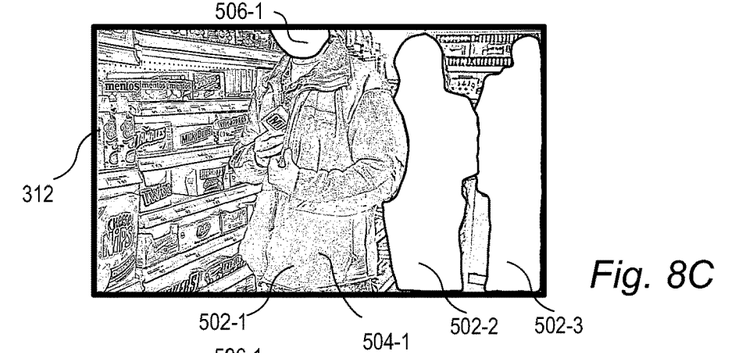

In more detail, the video data access component 402 may generate a second video stream 312 which is forwarded to the display component 404. A snapshot of the second video stream 312 is shown in FIG. 8C. As is seen therein, the second video stream 312 differs from the first video stream 306 in that it includes the video data depicting the first portion 504-1 of the selected object 502-1, while the second portion 506-1 of the object is still covered by a privacy mask. The second video stream 312 may be generated by the privacy masking component 402b from the input video stream 310 and with knowledge of the information 403 from the object detecting component 402a and information regarding the selected object 502-1 from the user input component 408. Specifically, the privacy masking component 402b may for the selected object 502-1 only cover object portions 506-1 of a type which is associated with a higher privacy level than the first privacy level. For non-selected objects 502-2, 502-3, the privacy masking component 402b keeps covering the whole objects with privacy masks. Thus, as shown in FIG. 8C, the selected object 502-1 is partially unmasked, while the other objects remain fully masked.

Figure 8D:
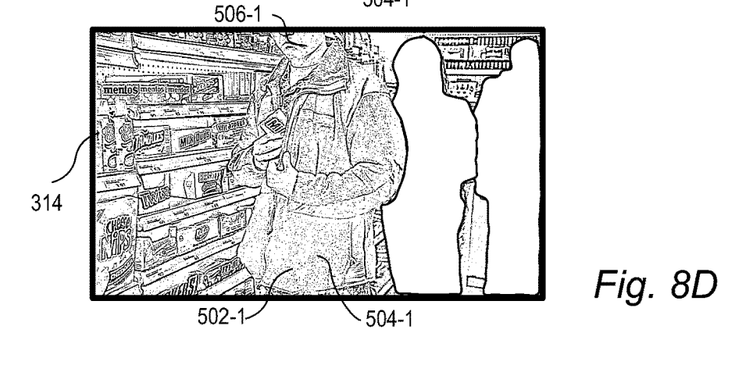

As previously explained with respect to the device 104, the user input may further grant access to video data depicting object portions 506-1, 506-2, 506-3 of the second, higher, privacy level. In those cases, the user may, if permitted, further be presented with a video stream where the selected object is further unmasked to also reveal video data depicting the object portion of the second privacy level. For example, the user may provide a further user input to indicate that he desires to further unmask the selected object 502-1. In response to such a further user input, the permission checking component 406 may check whether the permission associated with either the first or the further user-input grants access to video data depicting object portions 506-1, 506-2, 506-3 of the second privacy level. The check may be performed in the same way as described in connection to step S06 above, e.g. by checking that the currently logged-in is part of a user group having permission to view video depicting object portion of the second privacy level. If there is such a permission, the permission checking component 406 may instruct the video data access component 402 to access video data depicting the second portion 506-1 of the selected object 502-1. The video data access component 402 may then proceed to give the display component 404 access to the video data. In particular, the privacy masking component 402b may generate a third video stream 314. The third video stream 314 differs from the first video stream 306 in that it includes video data depicting both the first portion 504-1 of the selected object 502-1 and the video data depicting the second portion 506-1 of the selected object 502-1. In other aspects it is identical to the first video stream 306. A snapshot of the third video stream is shown in FIG. 8D. The privacy masking component 402b may generate the third video stream 314 from the input video stream 310 by covering any non-selected object 502-2, 502-3 by a privacy mask, and not covering object portions of the first and second privacy level of the selected object 502-1. In the illustrated example, the selected object 502-1 will hence be fully uncovered. The video stream 314 may then be displayed by the display component 204. Accordingly, responsive to a further user input, a permitted user is presented with a video stream 314 in which the selected object further unmasked to reveal video data depicting object portions of the first level of privacy as well as video data depicting object portions of the second level of privacy.

The devices 104, 204 comprises various components 202, 202a, 202a, 204, 206, 208, 402, 402a, 402b, 404, 406, 408 which are configured to implement the functionality of the respective device 104, 204. In particular, each illustrated component corresponds to a functionality of the respective device 104, 204. Generally, the devices 104, 204 may comprise circuitry which is configured to implement the components 202, 202a, 202a, 204, 206, 208, 402, 402a, 402b, 404, 406, 408 and, more specifically, their functionality. Thus, the circuitry may be said to be configured to execute the corresponding functionality.

In a hardware implementation, each of the components 202, 202a, 202a, 204, 206, 208, 402, 402a, 402b, 404, 406, 408 may correspond to circuitry which is dedicated and specifically designed to provide the functionality of the component. The circuitry may be in the form of one or more integrated circuits, such as one or more application specific integrated circuits or one or more field-programmable gate arrays. By way of example, the display component 204 may thus comprise circuitry which, when in use, displays a video stream.

In a software implementation, the circuitry may instead be in the form of a processor, such as a microprocessor, which in association with computer code instructions stored on a (non-transitory) computer-readable medium, such as a non-volatile memory, causes the device 104, 204 to carry out any method disclosed herein. Examples of non-volatile memory include read-only memory, flash memory, ferroelectric RAM, magnetic computer storage devices, optical discs, and the like. In a software case, the components 202, 202a, 202a, 204, 206, 208, 402, 402a, 402b, 404, 406, 408 may thus each correspond to a portion of computer code instructions stored on the computer-readable medium, that, when executed by the processor, causes the device 104, 204 to carry out the functionality of the component.

It is to be understood that it is also possible to have a combination of a hardware and a software implementation, meaning that the functionality of some of the components 202, 202a, 202a, 204, 206, 208, 402, 402a, 402b, 404, 406, 408 are implemented in hardware and others in software.

It will be appreciated that a person skilled in the art can modify the above-described embodiments in many ways and still use the advantages as shown in the embodiments above. For example, in the above a first example system in which object detection, privacy masking and encryption takes place in the camera, and a second example system in object detection and privacy masking takes place in a video management system were described. However, it is understood that example systems where one or more of these tasks are distributed over one or more devices which are separate from the camera and the video managements system are equally possible. In a first group of examples, the camera may capture video which is sent to such a separate device for object detection, privacy masking and encryption, before the result is forwarded to the video management system. The separate device may be a cloud-based device. If the camera is an analog camera, the separate device may be an encoder used to encode the video. The object detection may be performed by a first separate device, while the privacy masking and encryption may be performed by a second separate device. In a second group of examples, the camera captures video which is sent to a separate device for object detection, while privacy masking based on the object detection is still carried out in the video management system. The separate device performing the object detection may be a cloud-based device. In a third group of examples, the camera captures video which is forwarded to a first separate device for object detection, and then to a second separate device which performs privacy masking and access control by checking user permissions. In that case, the video management system is merely used as a user interface for displaying video and receiving user input. Thus, the teachings should not be limited to the shown embodiments but should only be defined by the appended claims. Additionally, as the skilled person understands, the shown embodiments may be combined.

The invention claimed is:

1. A method for partially unmasking a selected person or car in a video stream, comprising:
    displaying a first video stream in which a plurality of persons or cars are covered by privacy masks, wherein each of the privacy masks of the plurality of persons or cars has a first portion being associated with a first privacy level, and a second portion being associated with a second, higher, privacy level,
    receiving user input regarding a selection of one person or car among the plurality of persons or cars being covered by privacy masks in the first video stream,
    checking that a permission associated with the user input grants access to video data depicting portions being covered by privacy mask portions associated with the first privacy level,
    giving access to video data depicting a first portion of the selected person or car being covered by the first portion of the privacy mask, and
    displaying a second video stream which differs from the first video stream in that it includes the video data depicting the first portion of the selected person or car previously being covered by the first portion of the privacy mask, while the second portion of the selected person or car is still covered by a privacy mask.

2. The method of claim 1, wherein the video data depicting the first portion of the selected person or car is encrypted, and wherein access to the video data depicting the first portion of the selected person or car is given by decrypting the video data depicting the first portion of the selected person or car using a first decryption key associated with the permission that grants access to video data depicting portions being associated with the first privacy level.

3. The method of claim 1, further comprising:
    generating the second video stream by merging the first video stream with the video data depicting the first portion of the selected person or car.

4. The method of claim 1, wherein the video data depicting the first portion of the selected person or car is accessed from a video stream in which portions associated with a first privacy level are visible and portions associated with the second privacy level are covered by privacy masks.

5. The method of claim 4, wherein the second video stream is generated by replacing an image region which includes the selected person or car being covered by a privacy mask in the first video stream by a corresponding image region in the video stream in which portions associated with a first privacy level are visible and portions associated with the second privacy level are covered by privacy masks.

6. The method of claim 1, wherein the user input regarding a selection of one person or car among the plurality of persons or cars is indicative of an image region in the first video stream, the image region including the selected person or car being covered by a privacy mask in the first video stream.

7. The method of claim 1, wherein the first video stream includes metadata being indicative of image regions in the first video stream being covered by privacy masks, wherein the user input regarding a selection of one person or car among the plurality of persons or cars is indicative of an image position within one of the image regions.

8. The method of claim 1, further comprising:
    checking that the permission associated with the user input further grants access to video data depicting portions being associated with the second privacy level,
    giving access to video data depicting the second portion of the person or car, and
    displaying a third video stream which differs from the first video stream in that it includes both the video data depicting the first portion of the selected person or car and the video data depicting the second portion of the selected person or car.

9. The method of claim 8, wherein the step of displaying the third video stream is made in response to a further user input.

10. The method of claim 8, wherein the video data depicting the second portion of the selected person or car is encrypted, and wherein access to the video data depicting the second portion of the selected person or car is given by decrypting the video data depicting the second portion of the selected person or car using a second decryption key associated with the permission that further grants access to video data depicting portions being associated with the second privacy level.

11. The method of claim 8, further comprising:
generating the third video stream by merging the first video stream with the video data depicting the first portion of the selected person or car and the video data depicting the second portion of the selected person or car.

12. The method of claim 8, wherein the video data depicting the second portion of the selected person or car is accessed from a video stream in which portions associated with at least the second privacy level are visible.

13. The method of claim 12, wherein the video data depicting the second portion of the selected person or car is accessed from a video stream in which only portions associated with the second privacy level are visible.

14. A device for partially unmasking a selected person or car in a video stream, comprising circuitry configured to execute:
a display function configured to display a first video stream in which a plurality of persons or cars are covered by privacy masks, wherein each of the privacy masks of the plurality of persons or cars has a first portion being associated with a first privacy level, and a second portion being associated with a second, higher, privacy level,
a user input receiving function configured to receive a user input regarding a selection of one person or car among the plurality of persons or cars being covered by a privacy mask in the first video stream,
a permission checking function configured to check that a permission associated with the user input grants access to video data depicting portions being covered by privacy mask portions associated with the first privacy level,
a video data accessing function to give access to video data depicting a first portion of the selected person or car being covered by the first portion of the privacy mask, and
a display function configured to display a second video stream which differs from the first video stream in that it includes the video data depicting the first portion of the selected person or car previously being covered by the first portion of the privacy mask, while the second portion of the selected person or car is still covered by a privacy mask.

15. A non-transitory computer-readable storage medium comprising computer-code instructions adapted to carry out a method, when executed by a device having processing capability, comprising:
displaying a first video stream in which a plurality of persons or cars are covered by privacy masks, wherein each of the privacy masks of the plurality of persons or cars has a first portion being associated with a first privacy level, and a second portion being associated with a second, higher, privacy level,
receiving user input regarding a selection of one person or car among the plurality of persons or cars being covered by privacy masks in the first video stream,
checking that a permission associated with the user input grants access to video data depicting portions being covered by privacy mask portions associated with the first privacy level,
giving access to video data depicting a first portion of the selected person or car being covered by the first portion of the privacy mask, and displaying a second video stream which differs from the first video stream in that it includes the video data depicting the first portion of the selected person or car previously being covered by the first portion of the privacy mask, while the second portion of the selected person or car is still covered by a privacy mask.

\* \* \* \* \*